United States Patent
Nath (10) Patent No.: US 8,542,240 B2
(45) Date of Patent: Sep. 24, 2013

(54) ELECTRONIC DEVICE HAVING SWITCHABLE GRAPHICS PROCESSORS

(75) Inventor: Siddhartha Nath, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 12/798,073

(22) Filed: Mar. 29, 2010

(65) Prior Publication Data

US 2010/0245366 A1     Sep. 30, 2010

(51) Int. Cl.
   *G06F 15/16*     (2006.01)
(52) U.S. Cl.
   USPC ......................................................... 345/502
(58) Field of Classification Search
   USPC ......................................................... 345/502
   See application file for complete search history.

(56) References Cited

U.S. PATENT DOCUMENTS

| 5,047,760 | A | * | 9/1991 | Trevett et al. ................. 345/558 |
| 6,954,851 | B2 | * | 10/2005 | Natu ................................. 713/2 |
| 2008/0030509 | A1 | * | 2/2008 | Conroy et al. ................ 345/502 |
| 2008/0204460 | A1 | * | 8/2008 | Marinkovic et al. .......... 345/502 |
| 2008/0244758 | A1 | * | 10/2008 | Sahita et al. .................... 726/34 |

* cited by examiner

*Primary Examiner* — Ryan R Yang
(74) *Attorney, Agent, or Firm* — Caven & Aghevli LLC (57) ABSTRACT

An electronic device comprises at least two graphics processors, referred to herein as an integrated graphics processor and a discrete graphics processor. In some circumstances, the device may be switched between the integrated graphics processor and the discrete graphics processor. In some embodiments, techniques are implemented to lock temporarily the screen display on the output of a controller while the device executes a switch between graphics processors, thereby eliminating, or at least reducing, the presence of a blank output display on the electronic device. Other embodiments may be described.

16 Claims, 11 Drawing Sheets

EDID_SELECT#       dGPU_SELECT#

0 – dGPU           0 – dGPU
1 – iGPU           1 – iGPU

ELECTRONIC DEVICE HAVING SWITCHABLE GRAPHICS PROCESSORS

REFERENCE TO RELATED APPLICATIONS

This application is related to and claims priority from India Patent Application Serial No. 651/DEL/2009 entitled "ELECTRONIC DEVICE HAVING SWITCHABLE GRAPHICS PROCESSORS," which was filed Mar. 31, 2009; the disclosure of which is incorporated by reference in its entirety.

BACKGROUND

The subject matter described herein relates generally to the field of electronic communication and more particularly to an electronic device having switchable graphics processors.

Some electronic devices such as computing systems may utilize multiple graphics processors. Such devices may be configured to switch between graphics processors in response to a request from a user, or in response to changes in the environment, e.g., changes in the power source or in a battery charge supply.

BRIEF DESCRIPTION OF THE DRAWINGS

The detailed description is described with reference to the accompanying figures.

DETAILED DESCRIPTION

Described herein are exemplary systems and methods for to implement switchable graphics processors in electronic devices. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
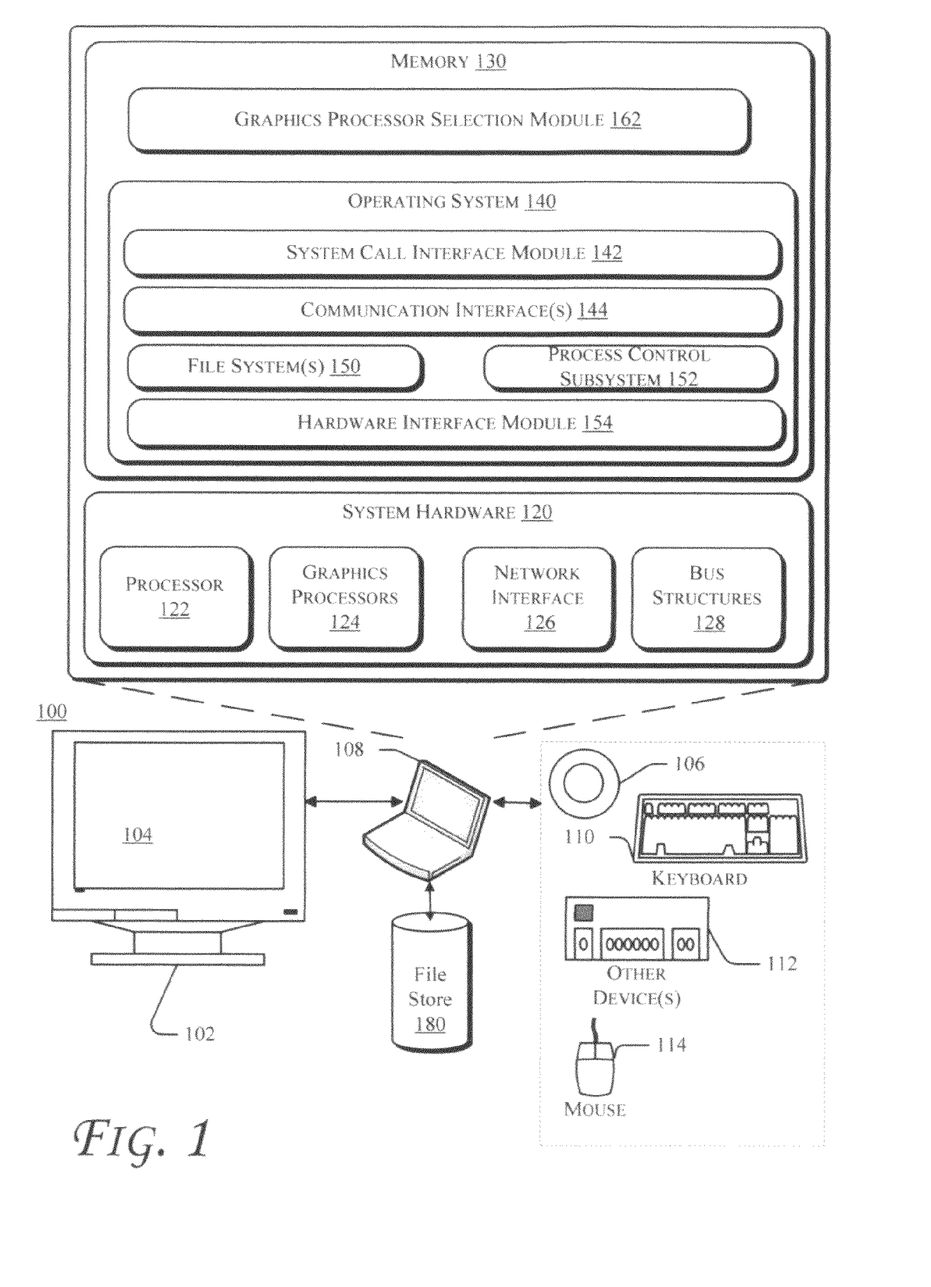
FIG. 1 is a schematic illustration of an exemplary computing device which may be adapted to utilize switchable graphics processors in accordance with some embodiments.

FIG. 1 is a schematic illustration of an exemplary computing device which may be adapted to utilize switchable graphics processors in accordance with some embodiments. In one embodiment, system 100 includes a computing device 108 and one or more accompanying input/output devices including a display 102 having a screen 104, one or more speakers 106, a keyboard 110, one or more other I/O device(s) 112, and a mouse 114. The other I/O device(s) 112 may include a touch screen, a voice-activated input device, a track ball, and any other device that allows the system 100 to receive input from a user.

The computing device 108 includes system hardware 120 and memory 130, which may be implemented as random access memory and/or read-only memory. A file store 180 may be communicatively coupled to computing device 108. File store 180 may be internal to computing device 108 such as, e.g., one or more hard drives, CD-ROM drives, DVD-ROM drives, or other types of storage devices. File store 180 may also be external to computer 108 such as, e.g., one or more external hard drives, network attached storage, or a separate storage network.

System hardware 120 may include one or more processors 122, at least two graphics processors 124, network interfaces 126, and bus structures 128. In one embodiment, processor 122 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 124 may function as adjunct processors that manages graphics and/or video operations. Graphics processors 124 may be integrated onto the motherboard of computing system 100 or may be coupled via an expansion slot on the motherboard.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 130 may include an operating system 140 for managing operations of computing device 108. In one embodiment, operating system 140 includes a hardware interface module 154 that provides an interface to system hardware 120. In addition, operating system 140 may include a file system 150 that manages files used in the operation of computing device 108 and a process control subsystem 152 that manages processes executing on computing device 108.

Operating system 140 may include (or manage) one or more communication interfaces that may operate in conjunction with system hardware 120 to transceive data packets and/or data streams from a remote source. Operating system 140 may further include a system call interface module 142 that provides an interface between the operating system 140 and one or more application modules resident in memory 130. Operating system 140 may be embodied as a UNIX operating system or any derivative thereof (e.g., Linux, Solaris, etc.) or as a Windows® brand operating system, or other operating systems.

In various embodiments, the computing device 108 may be embodied as a personal computer, a laptop computer, a personal digital assistant, a mobile telephone, an entertainment device, or another computing device.

In one embodiment, memory 130 includes a graphics processor selection module 162 to switching between graphics processors in computing system 100. In one embodiment, a graphics processor selection module 162 may include logic instructions encoded in a computer-readable medium which, when executed by processor 122, cause the processor 122 to implement operations to manage switching between graphics processors 124 in the computing system 100. Additional details about the operations implemented by graphics processor selection module are described below.

Figure 2:
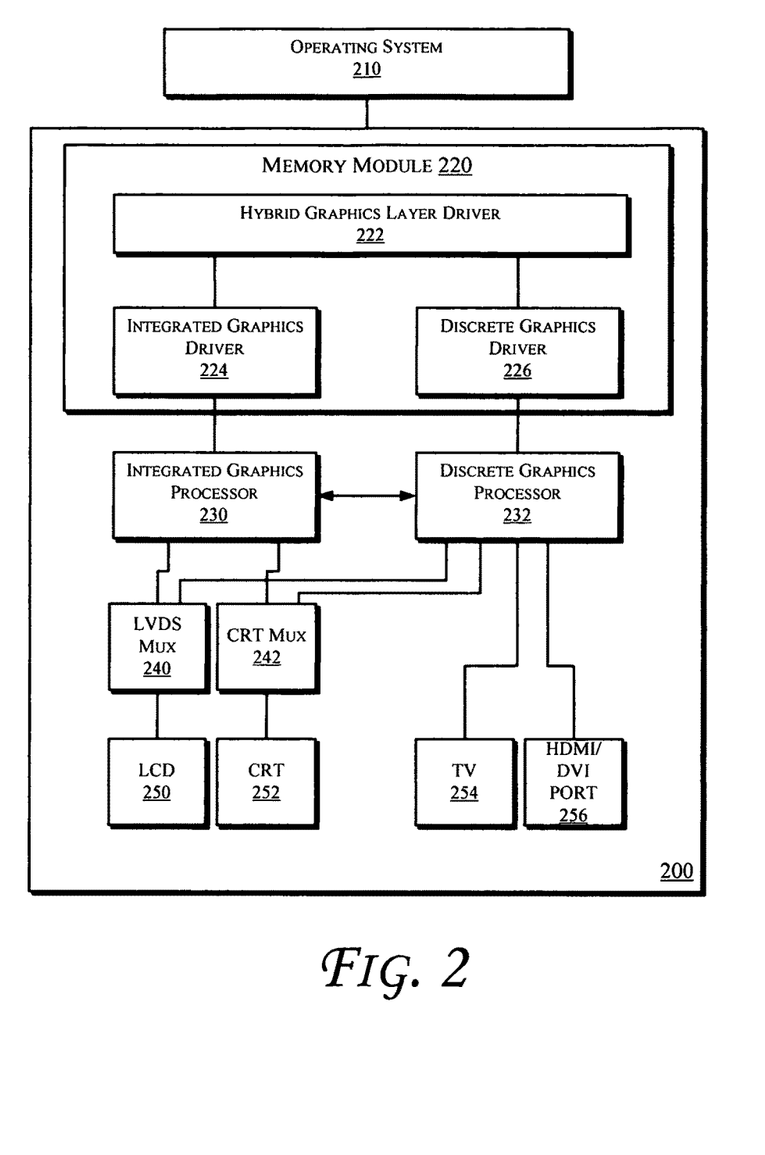
FIG. 2 is a schematic illustration of components of an apparatus adapted to utilize switchable graphics processors in accordance with some embodiments.

FIG. 2 is a schematic illustration of components of an electronic device 200 adapted to utilize switchable graphics processors in accordance with some embodiments. Referring to FIG. 2, in some embodiments electronic device comprises an operating system 210, a memory module 220, an integrated graphics processor 230 and a discrete graphics processor 232. The graphics controllers are coupled to a display such as an liquid crystal display (LCD) 250 by a low-voltage differential signaling (LVDS) multiplexer 240 and may be coupled to a cathode ray tube (CRT) display 252 by a CRT multiplexer 242. Similarly, the discrete graphics processor may be coupled directly to a display device such as, e.g., an analog television (TV) 254 or a High-Definition Multimedia Interface/Digital Video Interactive (HDMI)/(DVI) display port or a DisplayPort interface 256.

Figure 3:
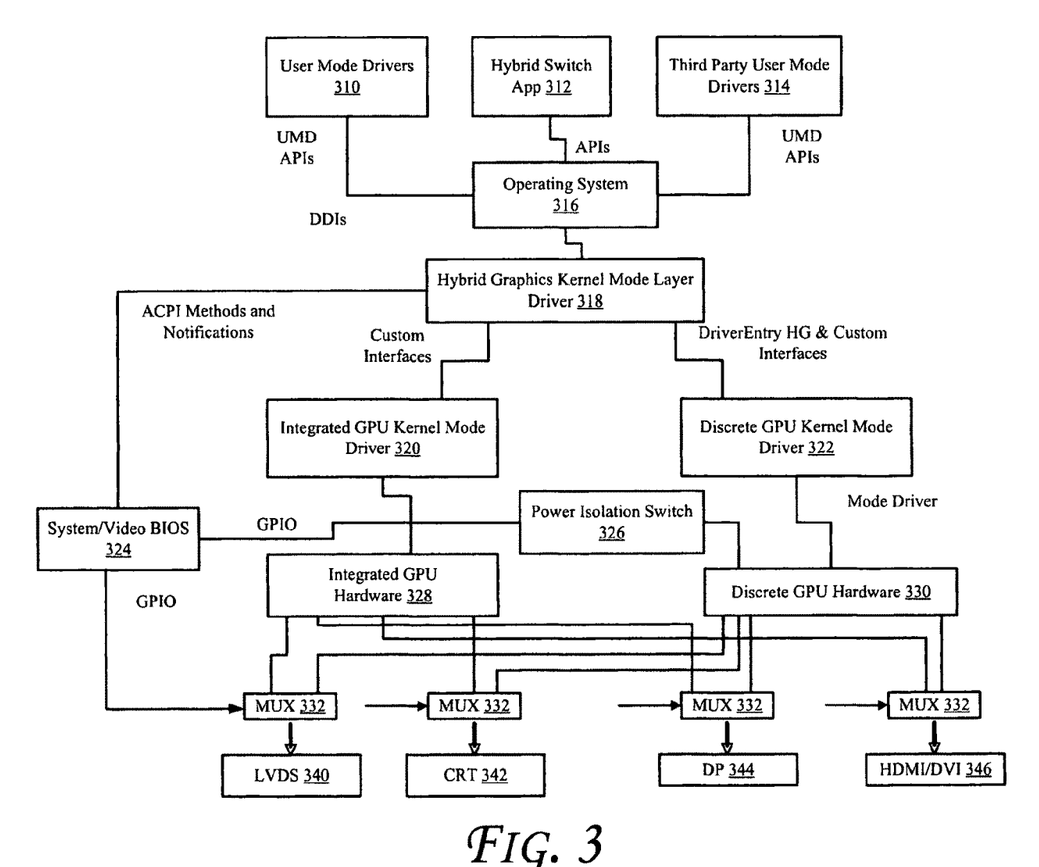
FIG. 3 is a schematic, logical view of components of an apparatus adapted to utilize switchable graphics processors in accordance with some embodiments.

FIG. 3 is a schematic, logical view of components of an architecture of an apparatus adapted to utilize switchable graphics processors in accordance with some embodiments. Referring to FIG. 3, one or more user mode drivers 310 and one or more third-party user mode drivers 314 are coupled to an operating system by one or more user mode driver application programming interfaces (UMD APIs). In addition, one or more hybrid switch applications 312 may be coupled to the operating system 312 by one or more APIs.

Operating system 316 is coupled to-a hybrid graphics kernel mode layer driver 318, which is in turn coupled to an integrated graphics processing unit (GPU) kernel mode drier 320 and a discrete GPU kernel mode driver 322. Hybrid graphics kernel mode layer driver 318 is further coupled to system/video basic input/output system (BIOS) 324, which communicate through one or more ACPI methods and/or notifications. Integrated GPU kernel mode driver 320 is coupled to integrated GPU hardware 328. Similarly, discrete GPU kernel mode driver 322 is coupled to discrete GPU hardware 330. The integrated GPU hardware 328 and the discrete GPU hardware 330 are coupled to one or more displays via multiplexers 332. The embodiment illustrated in FIG. 3 includes a low-voltage differential signal display (LVDS) 340, a cathode ray tube (CRT) display 342, a display port (DP) 344, and a high-definition multimedia interface (HDMI) to digital video interface (DMI) 346.

Figure 4:
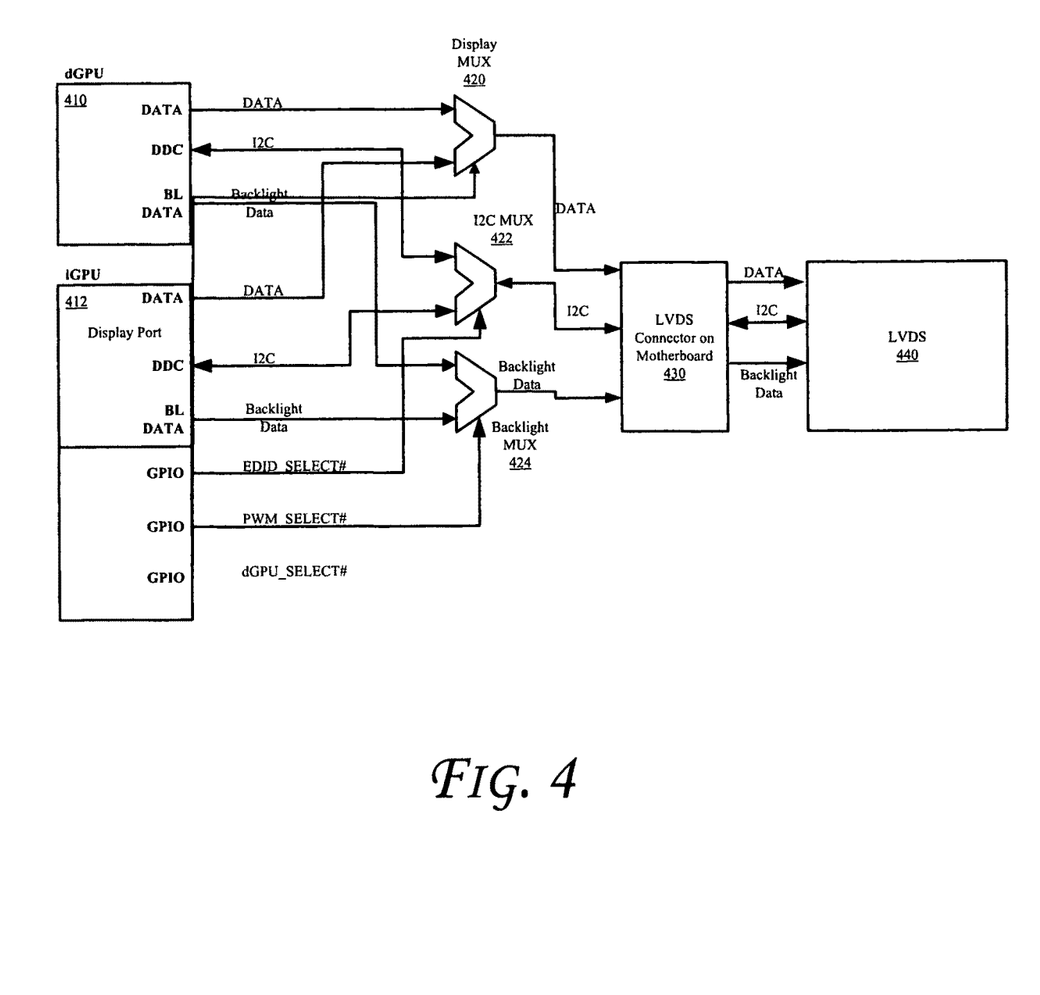
FIGS. 4-8 are schematic illustrations of connections between an integrated graphics processing unit, a discrete graphics processing unit, and one or more display outputs, according to embodiments.

FIGS. 4-8 are schematic illustrations of connections between an integrated graphics processing unit, a discrete graphics processing unit, and one or more display outputs, according to embodiments. FIG. 4 is an exemplary architecture for an LVDS display. Referring first to FIG. 4, a discrete GPU 410 and an integrated GPU 412 are coupled to a LVDS connector 430, which may be on a motherboard of a computing device. A display multiplexer 420 accepts inputs from the DATA outputs of the discrete GPU 410 and the integrated GPU 412. The display multiplexer 420 is driven by the dGPU_SELECT# signal from the iGPU 412. The inter-integrated circuit (I2C) multiplexer 422 accepts inputs from the I2C outputs of the discrete GPU 410 and the integrated GPU 412. The I2C multiplexer is driven by the EDID_SELECT# signal from the iGPU 412. Similarly the backlight multiplexer 424 accepts inputs from the BL DATA outputs of the discrete GPU 410 and the integrated GPU 412. The backlight multiplexer 424 is driven by the PWM_SELECT# signal from the iGPU 412. The LVDS connector 430 is, in turn, connected to an LVDS output 440.

Figure 5:
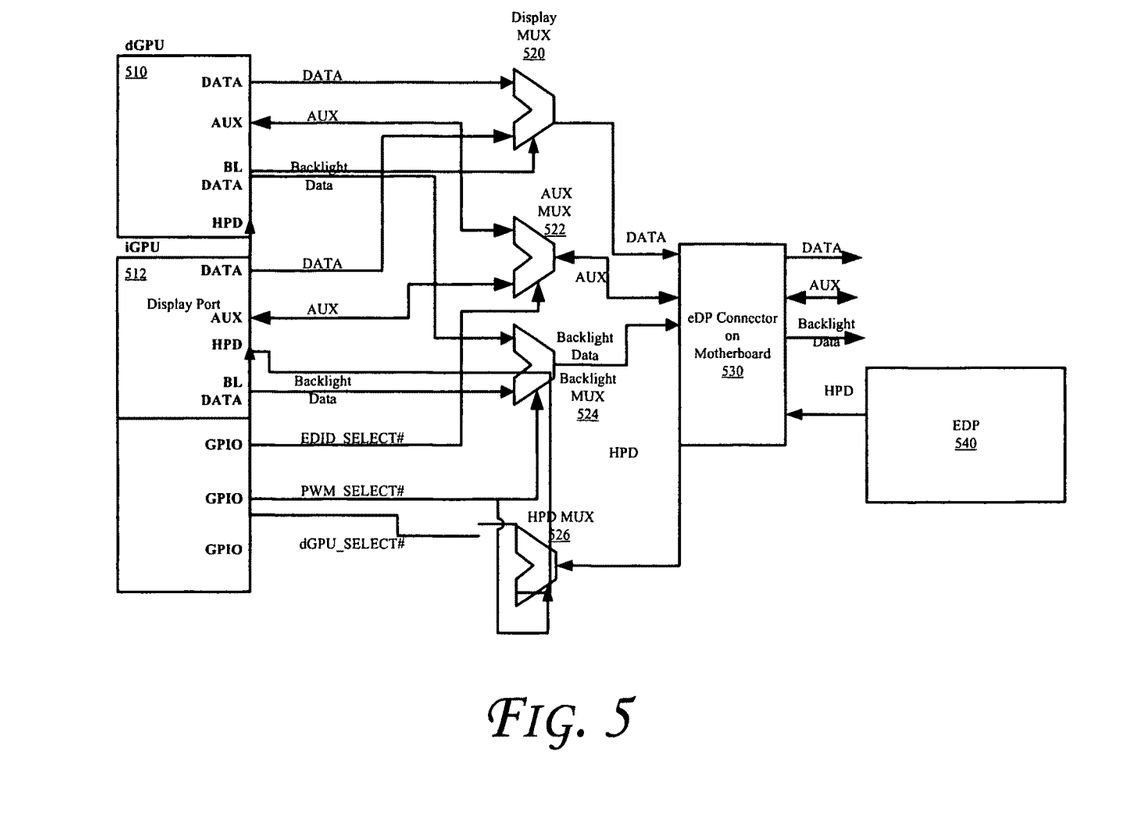

FIG. 5 is an exemplary architecture for an EDP display. Referring now to FIG. 5, a discrete GPU 510 and an integrated GPU 512 are coupled to an eDP connector 530, which may be on a motherboard of a computing device. A display multiplexer 520 accepts inputs from the DATA outputs of the discrete GPU 510 and the integrated GPU 512. The display multiplexer 520 is driven by the dGPU_SELECT# signal from the iGPU 512. The auxiliary multiplexer 522 accepts inputs from the auxiliary outputs of the discrete GPU 510 and the integrated GPU 512. The auxiliary multiplexer is driven by the EDID_SELECT# signal from the iGPU 512. Similarly the backlight multiplexer 524 accepts inputs from the BL DATA outputs of the discrete GPU 510 and the integrated GPU 512. The backlight multiplexer 524 is driven by the PWM_SELECT# signal from the iGPU 512. The EDP connector 530 is, in turn, connected to an EDP output 540.

Figure 6:
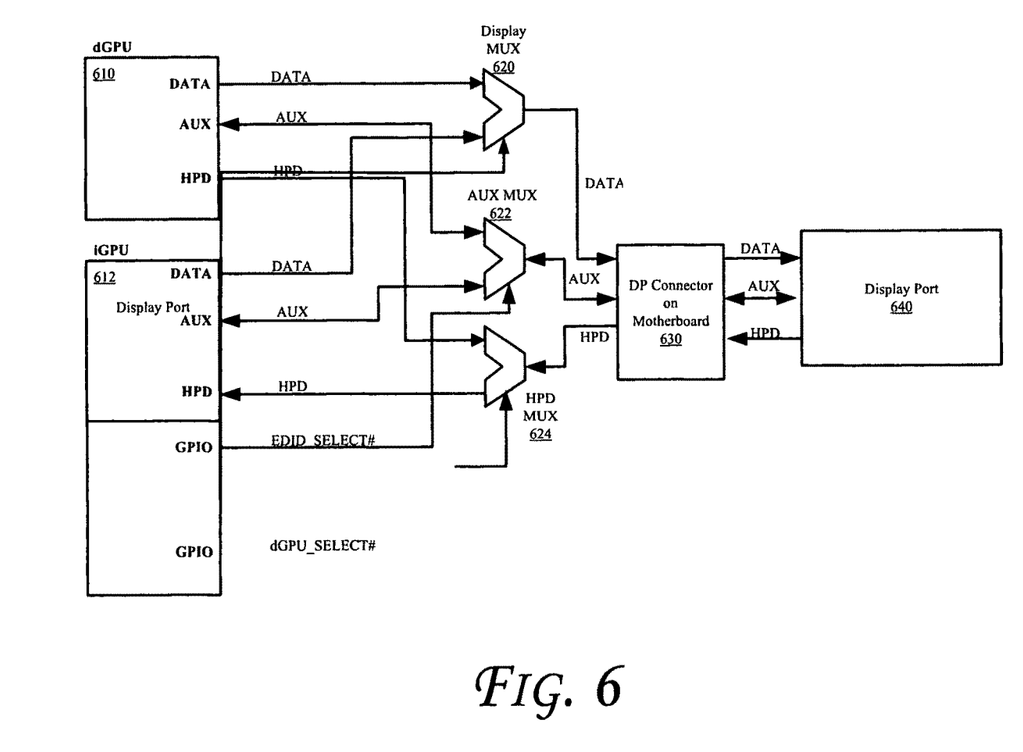

FIG. 6 is an exemplary architecture for a DP display. Referring now to FIG. 6, a discrete GPU 610 and an integrated GPU 612 are coupled to an DP connector 630, which may be on a motherboard of a computing device. A display multiplexer 620 accepts inputs from the DATA outputs of the discrete GPU 610 and the integrated GPU 612. The display multiplexer 620 is driven by the dGPU_SELECT# signal from the iGPU 612. The auxiliary multiplexer 622 accepts inputs from the auxiliary outputs of the discrete GPU 610 and the integrated GPU 612. The auxiliary multiplexer is driven by the EDID_SELECT# signal from the iGPU 612. Similarly the HDP multiplexer 624 accepts inputs from the HDP outputs of the discrete GPU 510 and the integrated GPU 5412. The HDP multiplexer 624 is driven by the dGPU_SELECT# signal from the iGPU 612. The DP connector 630 is, in turn, connected to an display port output 640.

Figure 7:
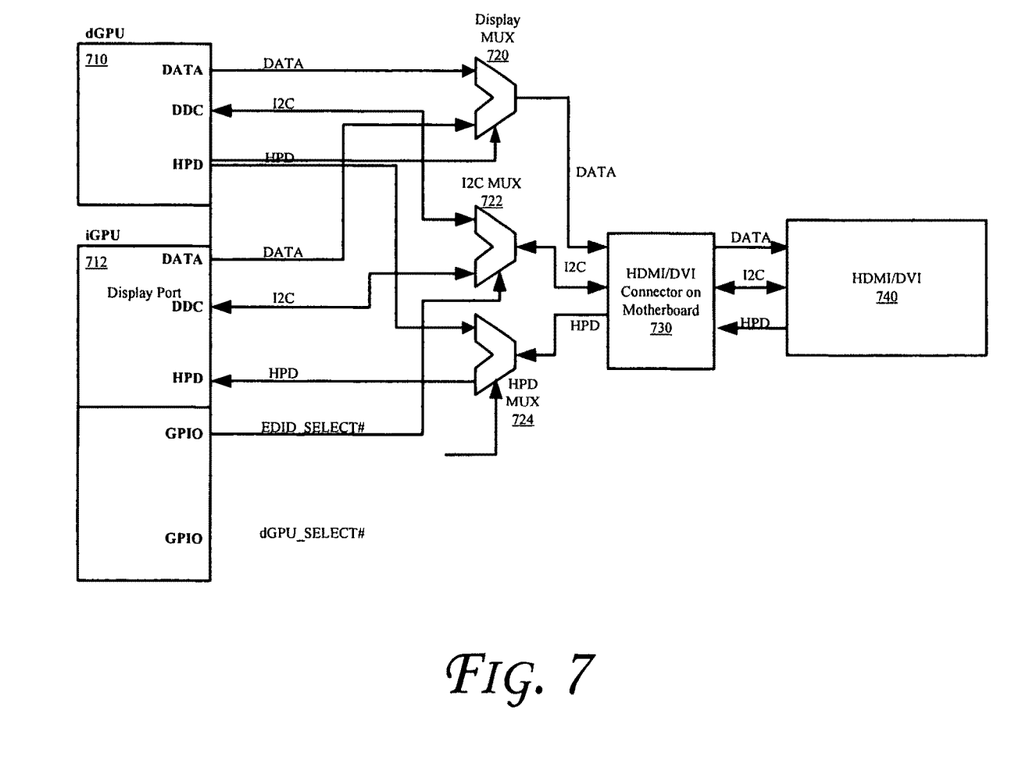

FIG. 7 is an exemplary architecture for an HDMI/DVI display. Referring now to FIG. 7, a discrete GPU 710 and an integrated GPU 712 are coupled to an HDMI/DVI connector 730, which may be on a motherboard of a computing device. A display multiplexer 720 accepts inputs from the DATA outputs of the discrete GPU 710 and the integrated GPU 712. The display multiplexer 720 is driven by the dGPU_SELECT# signal from the iGPU 712. The I2C multiplexer 722 accepts inputs from the I2C outputs of the discrete GPU 710 and the integrated GPU 712. The I2C multiplexer 722 is driven by the EDID_SELECT# signal from the iGPU 712. Similarly the HDP multiplexer 724 accepts inputs from the HDP outputs of the discrete GPU 710 and the integrated GPU 712. The HDP multiplexer 724 is driven by the dGPU_SELECT# signal from the iGPU 712. The DP connector 730 is, in turn, connected to an HDMI/DVI output 740.

Figure 8:
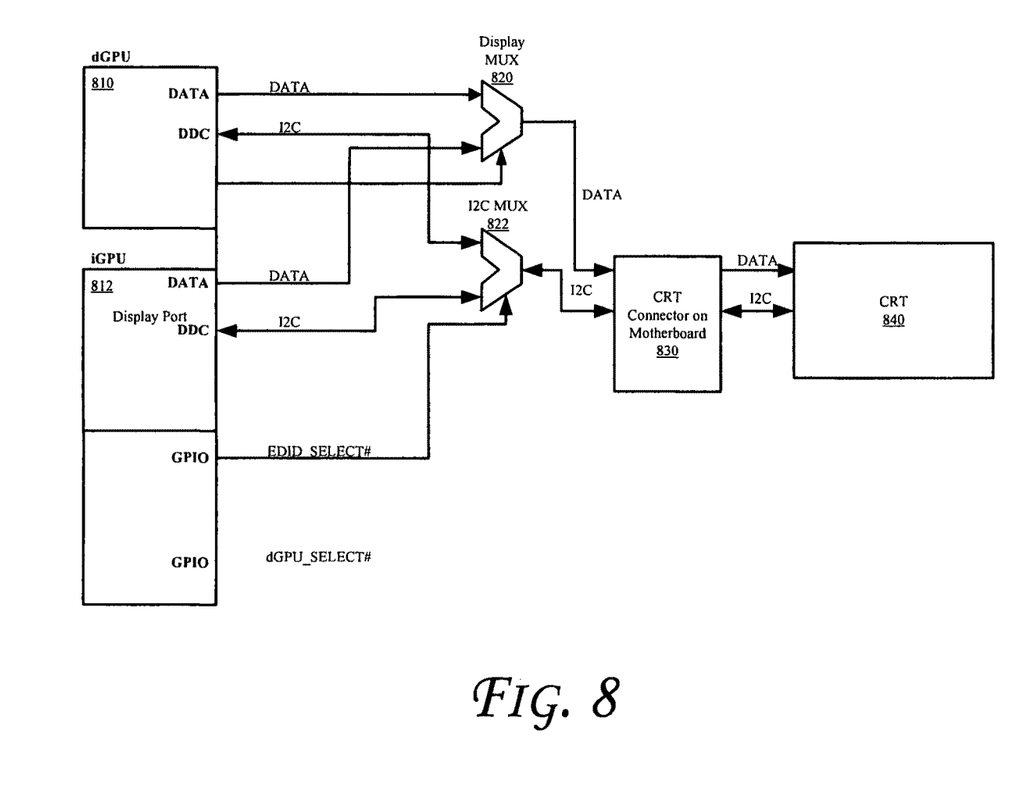

FIG. 8 is an exemplary architecture for a CRT display. Referring now to FIG. 8, a discrete GPU 810 and an integrated GPU 812 are coupled to a CRT connector 830, which may be on a motherboard of a computing device. A display multiplexer 820 accepts inputs from the DATA outputs of the discrete GPU 810 and the integrated GPU 812. The display multiplexer 820 is driven by the dGPU_SELECT# signal from the iGPU 812. The I2C multiplexer 822 accepts inputs from the I2C outputs of the discrete GPU 810 and the integrated GPU 812. The I2C multiplexer 822 is driven by the EDID_SELECT# signal from the iGPU 812.

Figure 9:
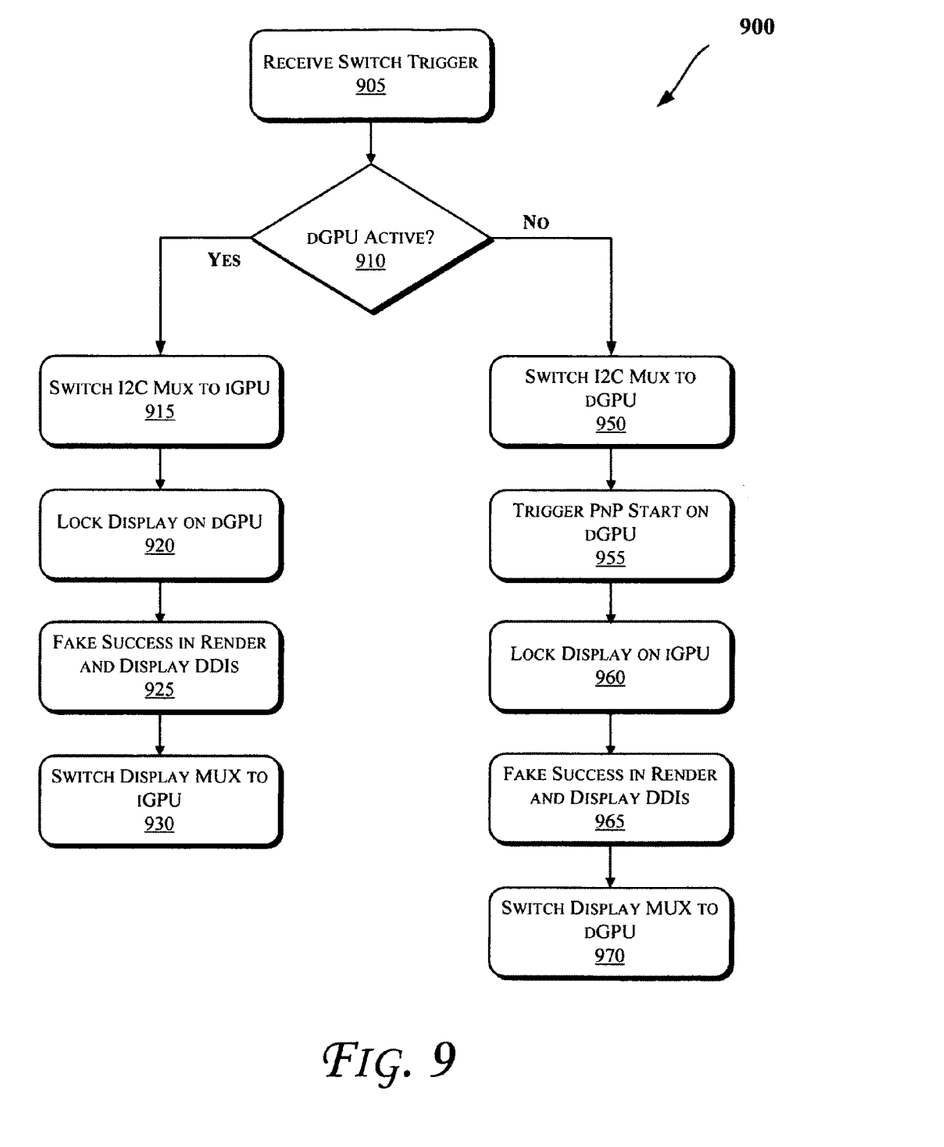
FIG. 9 is a flowchart illustrating operations in a method to switch between graphics controllers in an electronic device, in accordance with some embodiments.

FIG. 9 is a flowchart illustrating operations in a method to switch between graphics controllers in an electronic device, in accordance with some embodiments. In one embodiment, the operations of FIG. 9 may be implemented as logic instructions stored in a computer-readable medium such as, e.g., a memory module 130. Referring to FIG. 9, at operation 905 a switch trigger is received in the graphics processor selection module 162. In some embodiments the switch trigger may be implemented as a signal to switch from the integrated graphics processor 290 to the discrete graphics processor 292, or vice-versa. The signal may be generated by a user of the computer system 100, or in response to changes in the operating environment of the computer system 100. For example, in some embodiments the signal may be generated in response to a switch in the power source, e.g., switching from alternating current (AC) power to battery power or vice-versa, or in response to the battery falling below a threshold value.

At operation 910 it is determined whether the discrete graphics processor 292 is active. If the discrete graphics processor 292 is active, then control passes to operations 915-930, which implement logic operations to switch from the discrete graphics processor 232 to the integrated graphics processor 230. At operation 915 the I2C multiplexer is switched from the discrete graphics processor 232 to the integrated graphics processor 230. In some embodiments, the input/output pins on the I2C multiplexer are disconnected (i.e., deasserted) from the discrete graphics processor 232 and separate input/output pins are connected (i.e., asserted) to couple the I2C multiplexer to the integrated graphics processor 230.

At operation 920 the active display(s) is locked on the output of the discrete graphics processor 232, which effectively freezes the display output. Thereafter the hybrid graphics layer driver may block screen refresh rendering on the discrete graphics processor 232, and may also block inquiries from the operating system 210 from asking the lower level Integrated and Discrete graphics drivers to stop scanning from the memory to display. In some embodiments, this may be achieved by falsely reporting, i.e., faking, success in specific device driver interfaces (DDIs) that are trapped by the hybrid graphics layer driver (operation 925). This causes the last frame to be presented on the display to be locked such that the last frame remains presented on the display during the switchover process.

In one embodiment, the following Render DDIs in addition to any other DDI which would cause last frame to blank are falsely reported as a success while a transition is in progress:
DxgkDdiRender
DxkDdiPresent
DxgkDdiSubmitCommand
DxgkDdiPatch
DxgkDdiBuildPagingBuffer
DxgkDdiPreempt Similarly, the following Display DDIs in addition to any other DDI which would cause last frame to blank that need to fake success while a transition is in progress are:
DxgkDdiSetVidPnSourceAddress
DxgkDdiSetVidPnSourceVisibility
DxgkDdiCommitVidPn At operation 930 the display multiplexer is switched from the discrete graphics processor 232 to the integrated graphics processor 230. In one embodiment, the hybrid graphics layer driver and the GPU switch software waits for mode to be completely set on the integrated graphics processor 230 and for the operating system to render the desktop. After this, the graphics processor selection module 162 directs steers the display multiplexer to the integrated graphics processor 230, which presents the desktop on the display.

Figure 10A:
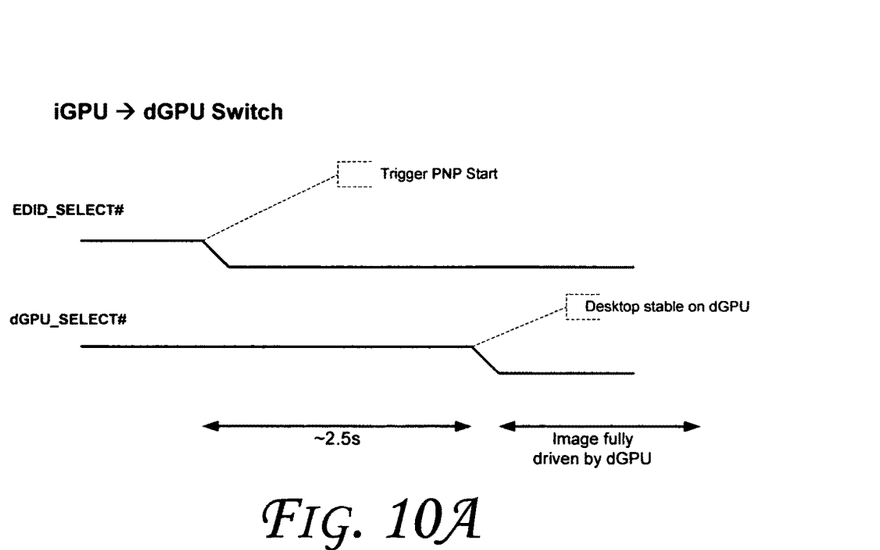
FIG. 10A is a schematic illustration of a timing diagram illustrating a switch from an integrated graphics controller to a discrete graphics controller, according to an embodiment.
Figure 10B:
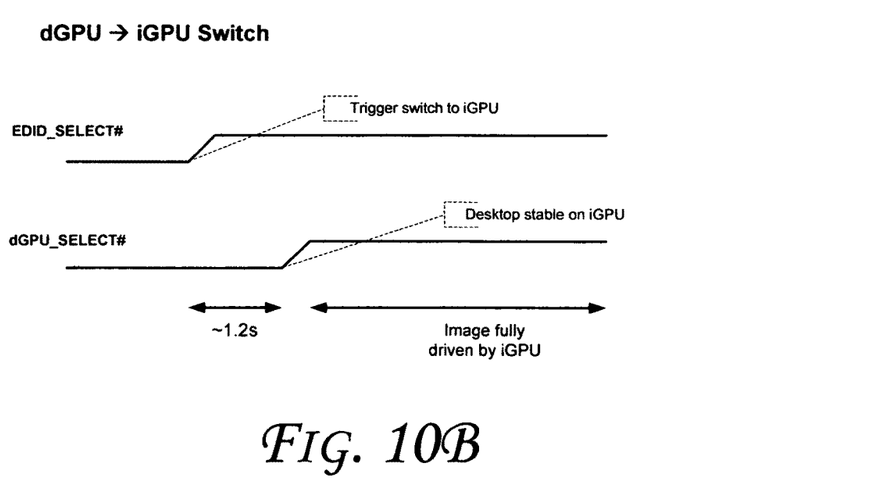
FIG. 10B is a schematic illustration of a timing diagram illustrating a switch form a discrete graphics controller to an integrated graphics controller, according to an embodiment.

FIG. 10B is a schematic illustration of a timing diagram illustrating a switch form a discrete graphics controller to an integrated graphics controller, according to an embodiment. Referring to FIG. 10B, when a switch to iGPU operation is triggered, the hybrid graphics layer driver makes the EDID_SELECT# signal go high. Subsequently, when the desktop becomes stable on the integrated GPU, the dGPU_SELECT# signal goes high, which causes the multiplexer to switch the output to the integrated GPU.

Referring back to operation, 910, if the discrete graphics processor 232 is not active, then control passes to operations 950-970, which implement logic operations to switch from the integrate graphics processor 230 to the discrete graphics processor 232. At operation 950 the I2C multiplexer is switched from the integrated graphics processor 230 to the discrete graphics processor 232. In some embodiments, the input/output pins on the I2C multiplexer are disconnected (i.e., deasserted) from the integrated graphics processor 232 and separate input/output pins are connected (i.e., asserted) to couple the I2C multiplexer to the discrete graphics processor 230.

At operation 955 a plug-n-play start is triggered on the discrete graphics processor 230. In the PnP start process, the operating system allocates resources, for example based on information from the PCI/PCIe configuration space, asks the device driver to allocate memory to create a device context, and initializes the device by programming registers and software sub-components. At the end of this step, the PCI/PCIe device is ready to generate and handle interrupts and process all IO requests directed to this device either by the operating system or by an application. The graphics driver in this step allocates the MiniportDeviceContext, programs registers to bring the hardware to a default ready state, detects displays, does EDID reads, demarcates memory segments and reports them to the operating system. At the end of the PnP start state, the graphics device is ready to handle render and display commands from the operating system and is able to generate and handle interrupts on completion on render instructions or display arrival/removal.

At operation 960 the active display(s) is locked on the output of the integrated graphics processor 230, which effectively freezes the display output. Thereafter the hybrid graphics layer driver may block screen refresh rendering on the integrated graphics processor 230, and may also block inquiries from the operating system 210 from asking the lower level graphics drivers to stop scanning from the memory to display. In some embodiments, this may be achieved by falsely reporting, i.e., faking, success in specific device driver interfaces (DDIs) that are trapped by the kernel mode filter driver (operation 965). This causes the last frame to be presented on the display to be locked such that the last frame remains presented on the display during the switchover process.

In one embodiment, the following Render DDIs in addition to other DDIs which may cause the last frame to blank are falsely reported as a succww success while a transition is in progress:

DxgkDdiRender
    DxkDdiPresent
    DxgkDdiSubmitCommand
    DxgkDdiPatch
    DxgkDdiBuildPagingBuffer
    DxgkDdiPreempt Similarly, the following Display DDIs in addition to other DDIs which may cause the last frame to blank that need to fake success while a transition is in progress are:

DxgkDdiSetVidPnSourceAddress
    DxgkDdiSetVidPnSourceVisibility
    DxgkDdiCommitVidPn At operation 970 the display multiplexer is switched from the discrete graphics processor 232 to the integrated graphics processor 230. In one embodiment, the kernel mode filter driver and the GPU switch software waits for mode to be completely set on the integrated graphics processor 230 and for the operating system to render the desktop. After this, the graphics processor selection module 162 directs steers the display multiplexer to the integrated graphics processor 230, which presents the desktop on the display.

FIG. 10A is a schematic illustration of a timing diagram illustrating a switch from an integrated graphics controller to a discrete graphics controller, according to an embodiment. Referring to FIG. 10A, just before triggering a PNP Start operation, the hybrid graphics layer driver makes EDID_SELECT# signal go low. Subsequently, when the desktop becomes stable on the discrete GPU, the dGPU_SELECT# signal goes low, which causes the multiplexer to switch the output to the discrete GPU.

Figure 11:
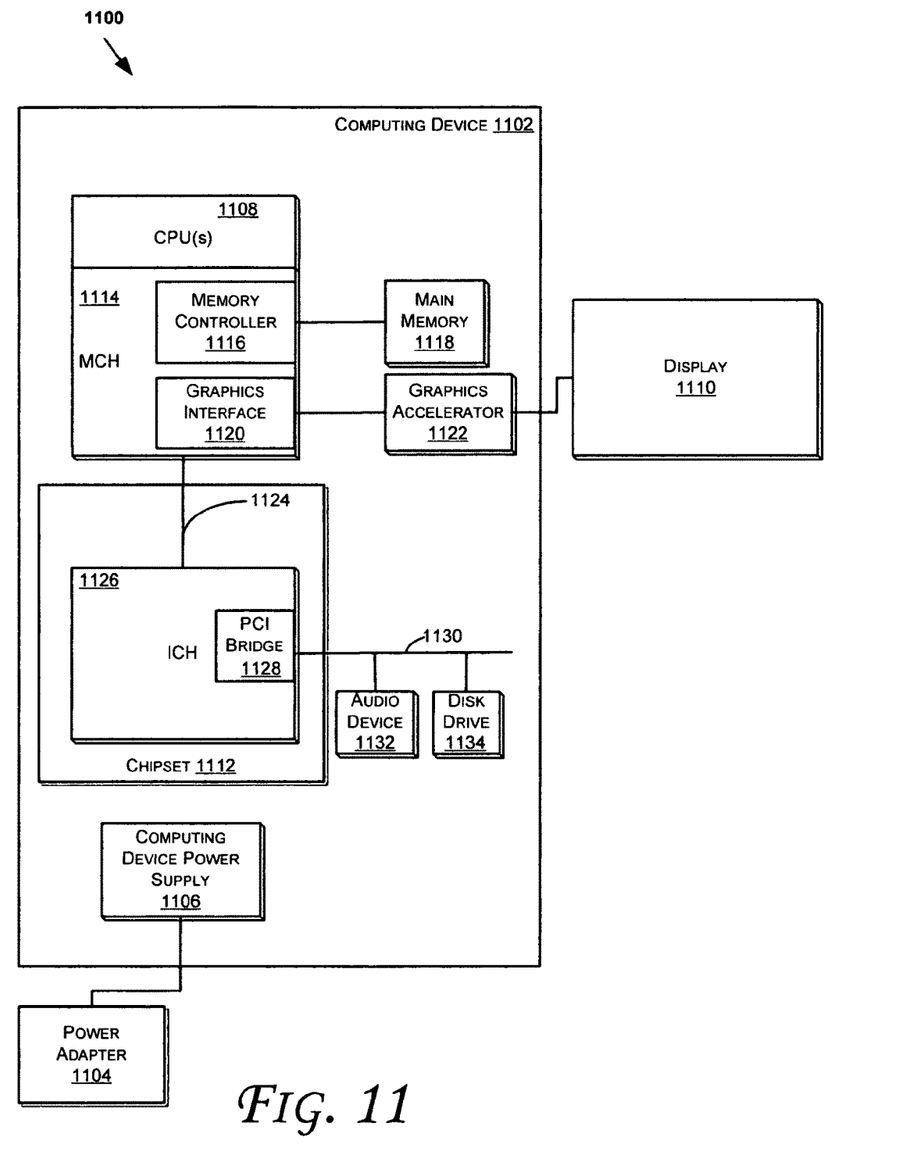
FIG. 11 is a schematic illustration of a computing system which may be adapted to implement switchable graphics processors, according to an embodiment.

FIG. 11 is a schematic illustration of a computer system 1100 in accordance with some embodiments. The computer system 1100 includes a computing device 1102 and a power adapter 1104 (e.g., to supply electrical power to the computing device 1102). The computing device 1102 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 1102 (e.g., through a computing device power supply 1106) from one or more of the following sources: one or more battery packs, an alternating current (AC) outlet (e.g., through a transformer and/or adaptor such as a power adapter 1104), automotive power supplies, airplane power supplies, and the like. In some embodiments, the power adapter 1104 may transform the power supply source output (e.g., the AC outlet voltage of about 110 VAC to 240 VAC) to a direct current (DC) voltage ranging between about 7 VDC to 12.6 VDC. Accordingly, the power adapter 1104 may be an AC/DC adapter.

The computing device 1102 may also include one or more central processing unit(s) (CPUs) 1108. In some embodiments, the CPU 408 may be one or more processors in the Pentium® family of processors including the Pentium® II processor family, Pentium® III processors, Pentium® IV, or CORE2 Duo processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 1112 may be coupled to, or integrated with, CPU 1108. The chipset 1112 may include a memory control hub (MCH) 1114. The MCH 1114 may include a memory controller 1116 that is coupled to a main system memory 1118. The main system memory 1118 stores data and sequences of instructions that are executed by the CPU 1108, or any other device included in the system 1100. In some embodiments, the main system memory 1118 includes random access memory (RAM); however, the main system memory 1118 may be implemented using other memory types such as dynamic RAM (DRAM), synchronous DRAM (SDRAM), and the like. Additional devices may also be coupled to the bus 1110, such as multiple CPUs and/or multiple system memories.

The MCH 1114 may also include a graphics interface 1120 coupled to a graphics accelerator 1122. In some embodiments, the graphics interface 1120 is coupled to the graphics accelerator 1122 via an accelerated graphics port (AGP). In some embodiments, a display (such as a flat panel display) 1140 may be coupled to the graphics interface 1120 through, for example, a signal converter that translates a digital representation of an image stored in a storage device such as video memory or system memory into display signals that are interpreted and displayed by the display. The display 1140 signals produced by the display device may pass through various control devices before being interpreted by and subsequently displayed on the display.

A hub interface 1124 couples the MCH 1114 to an platform control hub (PCH) 1126. The PCH 1126 provides an interface to input/output (I/O) devices coupled to the computer system 1100. The PCH 1126 may be coupled to a peripheral component interconnect (PCI) bus. Hence, the PCH 1126 includes a PCI bridge 1128 that provides an interface to a PCI bus 1130. The PCI bridge 1128 provides a data path between the CPU 1108 and peripheral devices. Additionally, other types of I/O interconnect topologies may be utilized such as the PCI Express™ architecture, available through Intel® Corporation of Santa Clara, Calif.

The PCI bus 1130 may be coupled to an audio device 1132 and one or more disk drive(s) 1134. Other devices may be coupled to the PCI bus 1130. In addition, the CPU 1108 and the MCH 1114 may be combined to form a single chip. Furthermore, the graphics accelerator 1122 may be included within the MCH 1114 in other embodiments.

Additionally, other peripherals coupled to the PCH 1126 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 1102 may include volatile and/or nonvolatile memory.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to switch between a discrete graphics processor and an integrated graphics processor in an electronic device, comprising:
    switching an I2C multiplexer from the discrete graphics processor to the integrated graphics processor;
    switching a graphics output mode from the discrete graphics processor to the integrated graphics processor; and
    locking a display on the output of the discrete graphics processor;
    falsely reporting, to an operating system executing on the electronic device, a successful transition from the discrete graphics processor to the integrated graphics processor by writing success indicators to at least one render device driver interface and at least one display device driver interface; and
    switching a display multiplexer from the discrete graphics processor to the integrated graphics processor after the integrated graphics processor has completed rendering an output.

2. The method of claim 1, wherein the I2C multiplexer comprises unique input/output pins coupled to the integrated graphics processor and wherein switching an I2C multiplexer from the discrete graphics processor to the integrated graphics processor comprises disconnecting one or more input/output pins from the discrete graphics processor and connecting one or more input/output pins to the integrated graphics processor.

3. The method of claim 1, wherein locking a display on the output of the discrete graphics processor further comprises blocking a screen refresh operation in an operating system executing on the electronic device, such that a blank screen is not presented on the display.

4. The method of claim 1, wherein locking a display on the output of the discreet graphics processor further comprises blocking a graphics driver from accessing a memory module.

5. An electronic device, comprising:
    a processor;
    a display;
    a discrete graphics processor and an integrated graphics processor;
    a memory module; and
    logic instructions stored in a computer readable medium which, when executed by the processor, configure the processor to switch between a discrete graphics processor and an integrated graphics processor in an electronic device by performing operations, comprising:
        switching an I2C multiplexer from the discrete graphics processor to the integrated graphics processor;
        switching a graphics output mode from the discrete graphics processor to the integrated graphics processor; and
        locking a display on the output of the discreet graphics processor;
        falsely reporting, to an operating system executing on the electronic device, a successful transition from the discrete graphics processor to the integrated graphics processor by writing success indicators to at least one render device driver interface and at least one display device driver interface; and
        switching a display multiplexer from the discrete graphics processor to the integrated graphics processor after the integrated graphics processor has completed rendering an output.

6. The electronic device of claim 5, further comprising logic instructions stored in a computer readable medium which, when executed by the processor, configure the processor to disconnect one or more input/output pins from the discrete graphics processor and connecting one or more input/output pins to the integrated graphics processor.

7. The electronic device of claim 5, further comprising logic instructions stored in a computer readable medium which, when executed by the processor, configure the processor to block a screen refresh operation in an operating system executing on the electronic device.

8. The electronic device of claim 5, further comprising logic instructions stored in a computer readable medium which, when executed by the processor, configure the processor to block a graphics driver from accessing a memory module.

9. A method to switch between an integrated graphics processor and a discrete graphics processor in an electronic device, comprising:
  switching an I2C multiplexer from the integrated graphics processor to the discrete graphics processor;
  initiating a plug-n-play start operation on the discrete graphics processor;
  switching a graphics output mode from the integrated graphics processor to the discrete graphics processor; and
  locking a display on the output of the integrated graphics processor;
  falsely reporting, to an operating system executing on the electronic device, a successful transition from the integrated graphics processor to the discrete graphics processor by writing success indicators to at least one render device driver interface and at least one display device driver interface; and
  switching a display multiplexer from the integrated graphics processor to the discrete graphics processor after the integrated graphics processor has completed rendering an output.

10. The method of claim 9, wherein the I2C multiplexer comprises unique input/output pins coupled to the integrated graphics processor and wherein switching an I2C multiplexer from the integrated graphics processor to the discrete graphics processor comprises disconnecting one or more input/output pins from the integrated graphics processor and connecting one or more input/output pins to the discrete graphics processor.

11. The method of claim 9, wherein locking a display on the output of the integrated graphics processor further comprises blocking a screen refresh operation in an operating system executing on the electronic device.

12. The method of claim 9, wherein locking a display on the output of the integrated graphics processor further comprises blocking a graphics driver from accessing a memory module.

13. An electronic device, comprising:
  a processor;
  a display;
  a discrete graphics processor and an integrated graphics processor;
  a memory module; and
  logic instructions stored in a computer readable medium which, when executed by the processor, configure the processor to switch between an integrated graphics processor and a discrete graphics processor in an electronic device by performing operations, comprising:
    switching an I2C multiplexer from the integrated graphics processor to the discrete graphics processor;
    initiating a plug-n-play start operation on the discrete graphics processor;
    switching a graphics output mode from the integrated graphics processor to the discrete graphics processor; and
    locking a display on the output of the integrated graphics processor;
    falsely reporting, to an operating system executing on the electronic device, a successful transition from the integrated graphics processor to the discrete graphics processor by writing success indicators to at least one render device driver interface and at least one display device driver interface; and
    switching a display multiplexer from the integrated graphics processor to the discrete graphics processor after the integrated graphics processor has completed rendering an output.

14. The electronic device of claim 13, wherein the I2C multiplexer comprises unique input/output pins coupled to the discrete graphics processor and wherein switching an I2C multiplexer from the discrete graphics processor to the integrated graphics processor comprises disconnecting one or more input/output pins from the discrete graphics processor and connecting one or more input/output pins to the integrated graphics processor.

15. The electronic device of claim 13, wherein locking a display on the output of the discrete graphics processor further comprises blocking a screen refresh operation in an operating system executing on the electronic device.

16. The electronic device of claim 13, wherein locking a display on the output of the discrete graphics processor further comprises blocking a graphics driver from accessing a memory module.

* * * * *

UNITED STATES PATENT AND TRADEMARK OFFICE
CERTIFICATE OF CORRECTION

PATENT NO. : 8,542,240 B2
APPLICATION NO. : 12/798073
DATED : September 24, 2013
INVENTOR(S) : Siddhartha Nath Page 1 of 1

It is certified that error appears in the above-identified patent and that said Letters Patent is hereby corrected as shown below:

In the Claims

In column 10, line 22, in claim 4, delete "discreet" and insert -- discrete --, therefor.

In column 10, line 40, in claim 4, delete "discreet" and insert -- discrete --, therefor.

Signed and Sealed this
Seventeenth Day of December, 2013

Margaret A. Focarino
*Commissioner for Patents of the United States Patent and Trademark Office*